United States Patent [19]

Ijima et al.

[11] Patent Number: 5,172,999

[45] Date of Patent: Dec. 22, 1992

[54] FIXING BRACKET FOR FLEXIBLE TUBE

[75] Inventors: Tetsuya Ijima, Sagamihara; Tomoyoshi Ohnuki, Kawasaki, both of Japan

[73] Assignees: Nissan Motor Co., Ltd.; Kato Hatsujo Kaisha, Ltd., both of Kanagawa, Japan

[21] Appl. No.: 770,429

[22] Filed: Oct. 3, 1991

[30] Foreign Application Priority Data

Oct. 12, 1990 [JP] Japan ............................ 2-106573[U]

[51] Int. Cl.$^5$ ................................................ F16B 7/10
[52] U.S. Cl. ........................................ 403/51; 403/134; 74/18.2; 277/212 FB; 277/181; 277/189; 267/122; 267/221; 267/34; 280/668; 411/508
[58] Field of Search ..................... 403/50–51, 403/405.1, 24, 288, 134, 338, 335; 74/18.2; 277/212 FB, 200, 181, 189; 267/122, 221, 34; 280/668; 464/175; 411/508–510, 338–339, 913

[56] References Cited

U.S. PATENT DOCUMENTS

| | | | |
|---|---|---|---|
| 3,547,474 | 12/1970 | Colletti et al. | 403/288 X |
| 4,146,258 | 3/1979 | Andruchiw | 403/338 X |
| 4,440,372 | 4/1984 | Wisniewski | 403/134 X |

FOREIGN PATENT DOCUMENTS 724877 1/1966 Canada ................................ 403/134

*Primary Examiner*—Andrew V. Kundrat
*Assistant Examiner*—Harry C. Kim
*Attorney, Agent, or Firm*—Wenderoth, Lind & Ponack

[57] ABSTRACT

A bracket for fixing to a prescribed member a flexible tube, such as the protective boot installed in an automobile suspension device, includes a stationary ring fixed on the prescribed member. A spacer ring is fitted to the stationary ring and provided with resilient supporting arms, and a fastening ring is fitted to the spacer ring for fastening a terminal part of the flexible tube. Alternatively, the stationary ring fixed on the prescribed member is provided with the resilient supporting arms, and the fastening ring is fitted to the stationary ring for fastening the terminal part of the flexible tube. By the fact that the fastening ring is rotatably retained directly or through the spacer ring on the stationary ring by virtue of the resilient force derived from the resilient supporting arms, provided either on the spacer ring or on the stationary ring, the bracket is infallibly fixed to the prescribed member through the stationary ring, and the flexible tube fastened to the fastening ring is allowed to rotate freely relative to the stationary ring. Thus, it is possible to eliminate the possibility that the terminal part of the flexible tube will be twisted as a consequence of the rotation of the prescribed member and will be eventually broken through fatigue.

6 Claims, 6 Drawing Sheets

FIXING BRACKET FOR FLEXIBLE TUBE

BACKGROUND OF THE INVENTION

1. Field of the Invention

The present invention relates to a bracket to be used exclusively for fixing a flexible tube, such as the protective boot installed in an automobile suspension device, to a prescribed member.

2. Description of the Prior Art

Automobile suspension devices come in several types, one of which is a strut type automobile suspension device.

A suspension device of the strut type, not specifically shown herein, but disclosed in Japanese Patent Public Disclosure No. 63-199108, is so constructed that a lower receiving plate is fixed to an upper terminal part of a dumper case, an upper receiving plate is rotatably disposed on the upper terminal part of a piston rod adapted to slide inside the dumper case, a compression coil spring is interposed between the upper and lower receiving plates, a protective boot made of rubber is wrapped around the projected periphery of the piston rod, and the upper terminal part of the protective boot is fixed at the upper receiving plate. Thus, impacts and vibrations exerted by the road surface upon a tire are absorbed by the actions of the compression coil spring and the dumper and are prevented from being directly transmitted to the automobile body.

In the automobile suspension device of the conventional strut type constructed as described above, however, the protective boot is fixed at the upper terminal part thereof to the upper receiving plate, and is not fixed, but left free, at the lower terminal part thereof.

When dirt, dust, etc. are hurled up from the road surface by the tire while the automobile is in motion, and are then suffered to reach the sealed surfaces of the dumper case and the piston rod via the open area in the lower terminal part of the protective boot, eventually adhering to the peripheral surface of the piston rod, there is a fair possibility of the dirt, dust, etc inflicting injury on the sealed surfaces as a consequence of the sliding motion of the piston rod.

In the suspension device of the strut type, therefore, the protective boot is required to be additionally fixed at the lower terminal part thereof to the upper end of the dumper case and consequently to be allowed to close the open region so as to protect the sealed surfaces against dirt, dust, etc.

In the suspension device of the strut type, however, for the absorption of the impacts and vibrations transmitted from the road surface, the compression coil spring is expanded or contracted proportionately to the sliding motion of the piston rod inside the dumper case to allow the wheel to move vertically. At this time, owing to the structural characteristics the compression coil spring is suffered to twist and, as a result, the upper receiving plate supporting the compression coil spring thereon is synchronously rotated in the same direction.

When the protective boot, in light of this structural characteristic, is so constructed as to be fixed not only on the upper terminal part but also on the lower terminal part, then as a consequence of the fixation on the lower terminal part, the rotation of the upper receiving plate, synchronized with the twisting of the compression coil spring, causes the upper terminal part of the protective boot fixed to the upper receiving plate to be automatically twisted in the same direction. Thus, there arises the possibility that the upper terminal part of the protective boot will fatigue and break owing to the twist of the upper terminal part of the protective boot.

By merely fixing the protective boot at the lower terminal part thereof, therefore, the peripheral surface of the piston rod cannot be effectively protected against dirt, dust, etc. because of the fatigue and breakage of the upper terminal part of the protective boot. In the field pertinent to this invention, therefore, the debut of a novel fixing means capable of effectively preventing the upper terminal part of the protective boot from being twisted in spite of the fixation of the protective boot at the lower terminal part thereof has been greatly longed for.

Accordingly, the primary object of the present invention, which has been developed to fulfill the above demand, is to provide a novel fixing bracket which prevents the terminal parts of a flexible tube from being twisted in consequence of the rotation of a pertinent member and precludes the possibility of the terminal parts of the flexible tube being broken through fatigue.

SUMMARY OF THE INVENTION

To accomplish the above object, according to the present invention there is provided a fixing bracket which comprises a stationary ring fixed on the side of a prescribed member, a spacer ring fitted to the stationary ring and a fastening ring fitted to the spacer ring for fastening a terminal part of a flexible tube. The spacer ring is provided with resilient supporting arms capable of rotatably supporting the fastening ring, and the fastening ring is rotatably retained in place on the stationary ring via the spacer ring by virtue of the resilient force of the resilient supporting arms.

There is also provided a fixing bracket comprising a stationary ring fixed on a prescribed member and a fastening ring fitted to a terminal part of a flexible tube, the stationary ring being provided with resilient supporting arms capable of rotatably supporting the fastening ring, and the fastening ring being rotatably retained in place directly on the stationary ring by virtue of the resilient force of the resilient supporting arms.

The above and other objects, characteristic features and advantages of the present invention will become more apparent from the description to be given hereinbelow with reference to the accompanying drawings.

DETAILED DESCRIPTION OF THE PREFERRED EMBODIMENTS

The present invention will be described more specifically below with reference to the illustrated embodiments.

The fixing bracket involved in the first embodiment illustrated in FIGS. 1 to 6 has been developed for the purpose of fastening the upper terminal part of a protective boot which is installed in an automobile suspension device.

Figure 1:
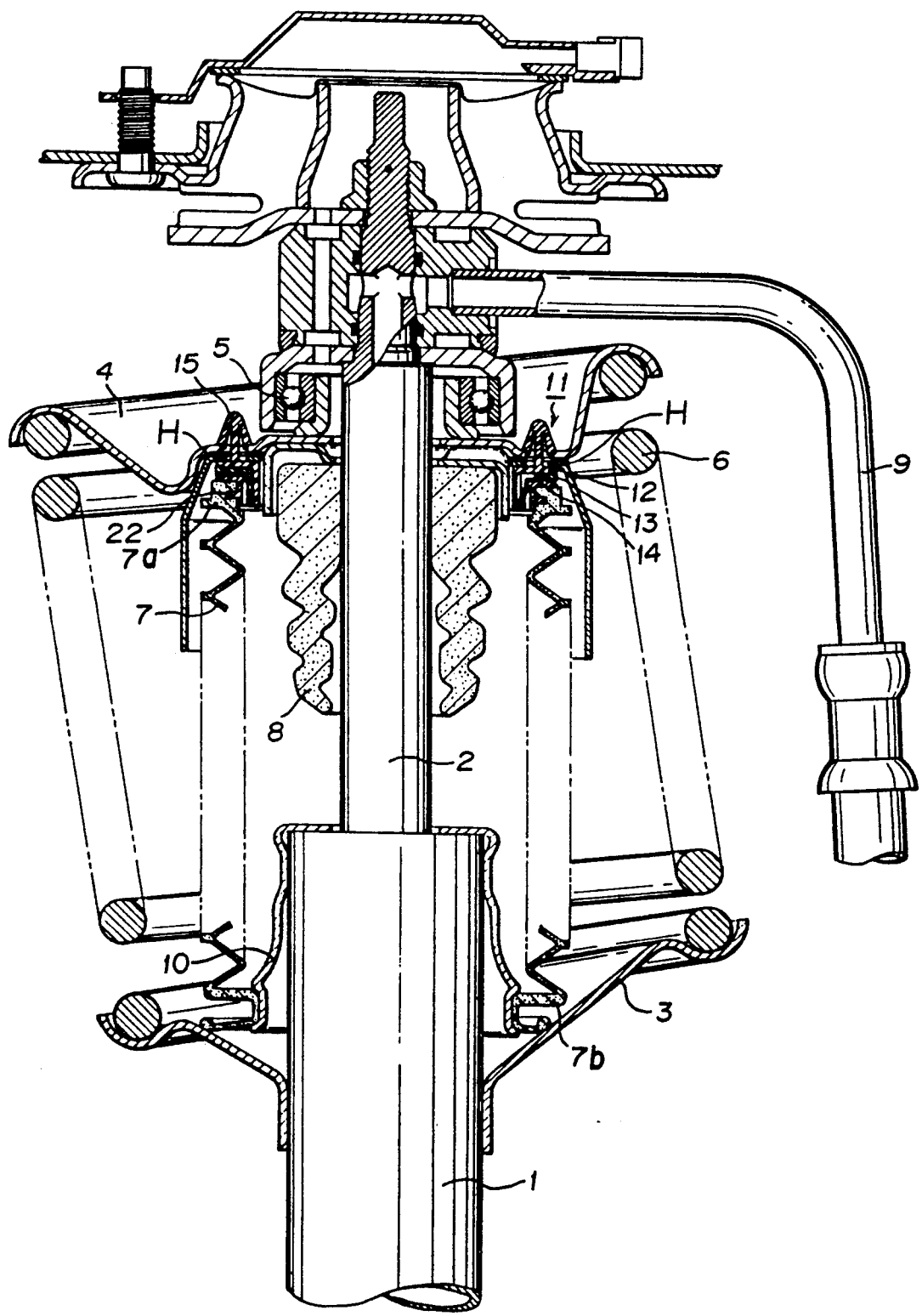
FIG. 1 is a cross sectional view illustrating the essential part of a suspension device in which one embodiment of a fixing bracket according to the present invention is used.

First, the suspension device for which the fixing bracket is used will be described briefly. This suspension device is of the strut type. As illustrated in FIG. 1, this suspension device is so constructed that a lower receiving plate 3 is fixed to the upper terminal part of a dumper case 1, an upper receiving plate 4 is rotatably disposed through a bearing 5 on the dumper case 1, a compression coil spring 6 is interposed between the upper and lower receiving plates 3 and 4, and a protective boot 7 is wrapped around the projecting periphery of a piston rod 2. In FIG. 1, reference numeral 8 stands for a dumper rubber member placed on in the upper part of the piston rod 2 and numeral 9 for a hydraulic pipe connected to the interior of the dumper case 1 through the interior of the piston rod 2.

A fixing bracket 11 of the present embodiment, which serves the purpose of attaching an upper terminal part 7a of the protective boot 7 to the upper receiving plate 4, will be described. As shown in FIGS. 2 to 5, the bracket 11 is composed of three parts, i.e. a stationary ring 12 formed in cross section roughly in the shape of the letter L, a spacer ring 13 and a fastening ring 14, all made of synthetic resin.

The stationary ring 12 is so constructed that a plurality of resilient engaging legs 15, adapted to be fastened to as many engaging holes H bored in the upper receiving plate 4, are integrally projected from a horizontal wall part. Depressed parts 16 of a prescribed width are formed equidistantly in the outer side of a vertical wall part, and lock claws 17 are formed with one along each of the lower edges of the depressed parts 16.

The spacer ring 13 is constructed with a plurality of engaging claws 18 adapted to plunge into the depressed parts 16 of the stationary ring 12 and engage with the lock claws 17. The engaging claws 18 are integrally formed inside the lower part of a vertical wall part, and a plurality of outwardly projecting resilient supporting arms 19 extend aslant through an empty space from the engaging claws 18 in the vertical wall part. The fastening ring 14 is so constructed that an annular shoulder part 21, adapted to be rotatably supported on the terminal edges of the resilient supporting arms 19, is formed projectingly along the inner terminal edge of a horizontal wall part and, at the same time, an annular hooking part 22, adapted to catch hold of the upper terminal part 7a of the protective boot 7, is integrally projected from the outside of the vertical wall part.

Figure 2:
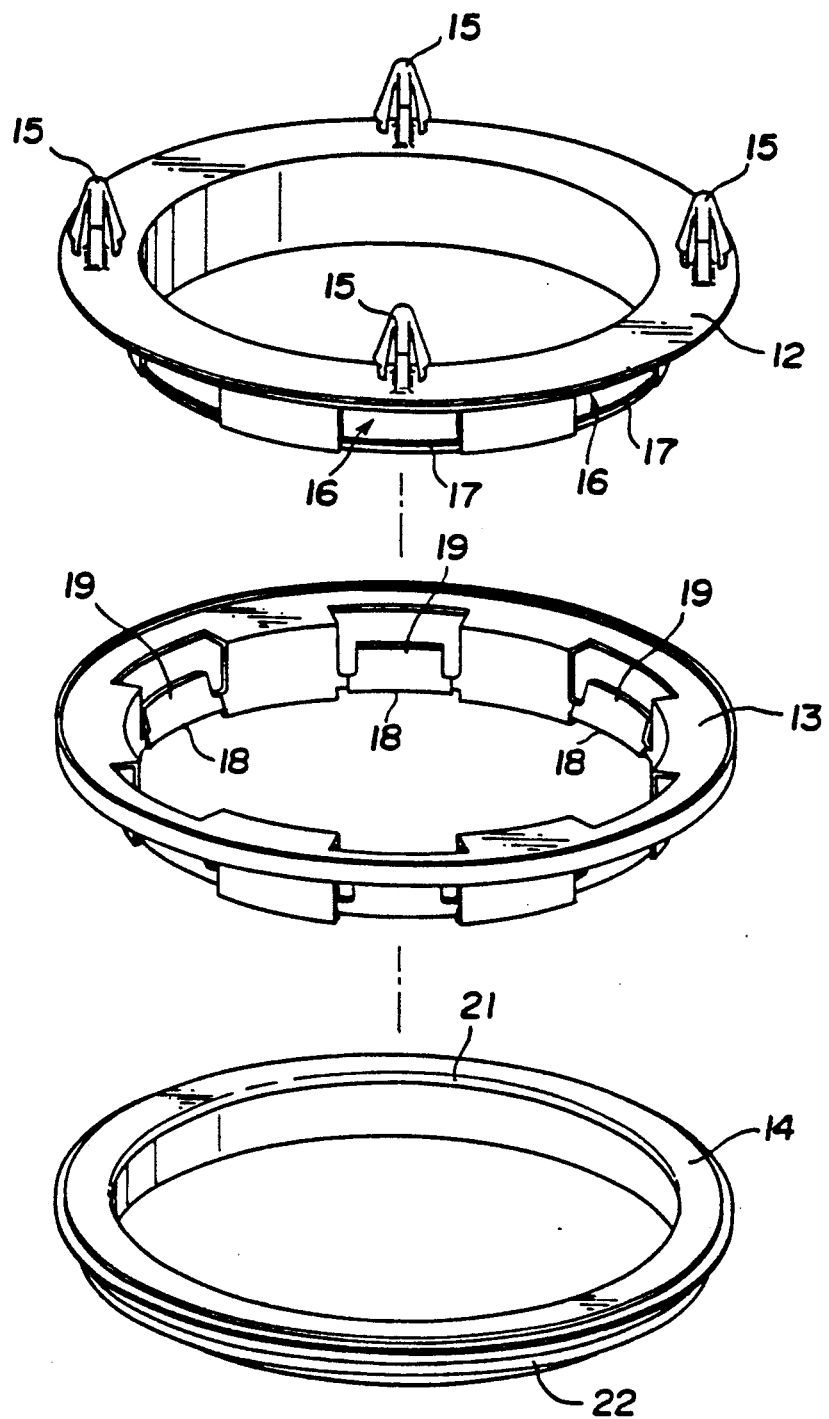
FIG. 2 is a perspective view illustrating the fixing bracket of FIG. 1 in an exploded state.
Figure 3:
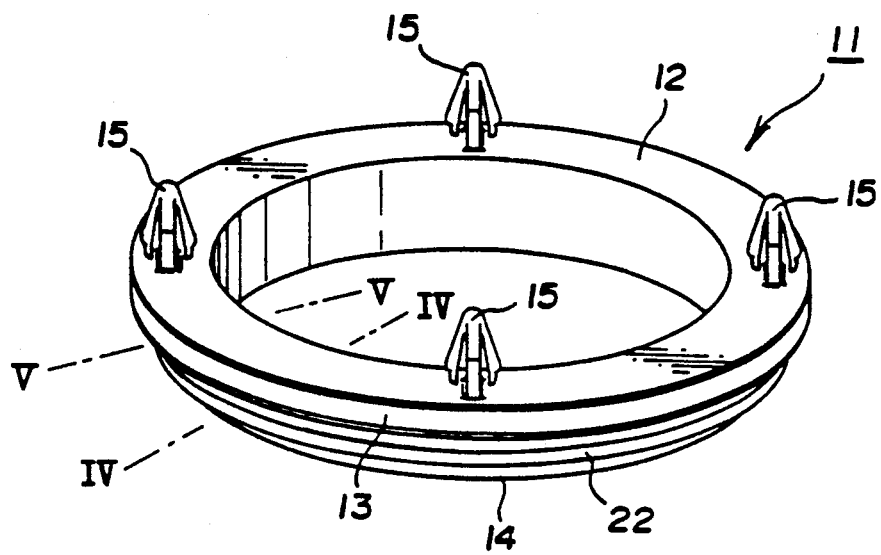
FIG. 3 is a perspective view illustrating the fixing bracket in an assembled state.
Figure 4:
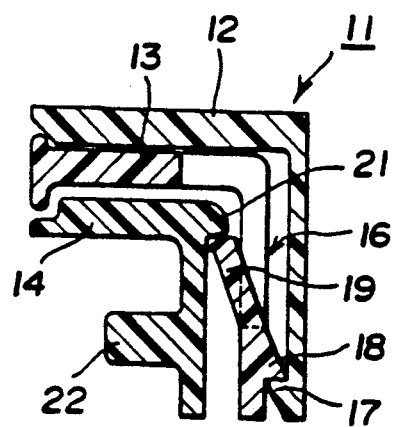
FIG. 4 is a cross sectional view taken along line IV—IV in FIG. 3.
Figure 5:
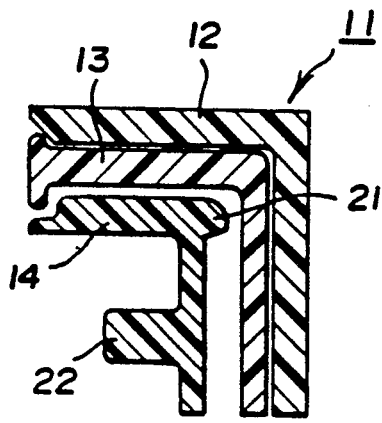
FIG. 5 is a cross sectional view taken along line V—V in FIG. 3.

When the spacer ring 13 is fitted on the stationary ring 12 from the outside, therefore, the engaging claws 18 of the spacer ring 13 are engaged with the corresponding lock claws 17 of the stationary ring 12 so that the spacer ring 13 is infallibly fastened to the stationary ring 12. When the fastening ring 14 is subsequently fitted on the spacer ring 13 from the outside with the aid of the flexibility of the resilient supporting arms 19, the terminal edges of the resilient supporting arms 19 of the spacer ring 13 are caused to resiliently support the annular shoulder part 21 of the fastening ring 14 and, owing to the resilient force derived from the resilient supporting arms 19, the fastening ring 14 is eventually retained rotatably on the stationary ring 12 through the spacer ring 13. Thus, the three parts 12, 13 and 14 shown in FIG. 2 are assembled into the fixing bracket 11 as shown in FIG. 3.

Figure 6:
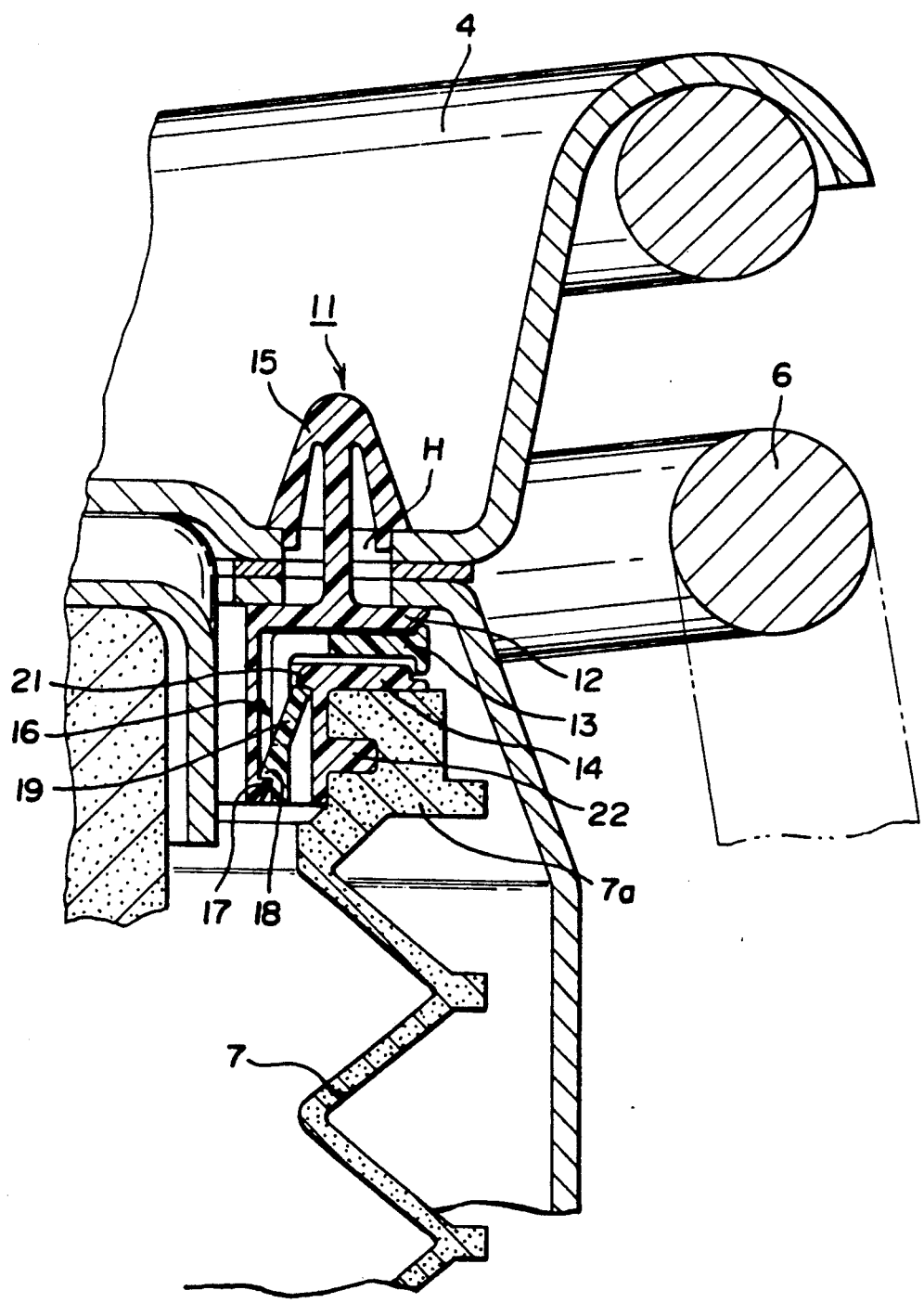
FIG. 6 is an enlarged, partially cutaway, cross sectional view illustrating the fixing bracket which has an upper terminal part of a protective boot fixed to an upper receiving plate.

The attachment of the upper terminal part 7a of the protective boot 7 to the upper receiving plate 4 by the use of the fixing bracket 11 constructed as described above is accomplished by causing the upper terminal part 7a of the protective boot 7 to be caught on the annular hooking part 22 and consequently enabling the protective boot 7 to be readily fastened to the fixing bracket 11 and thereafter forcing the resilient engaging legs 15 formed on the stationary ring 12 of the fixing bracket 11 into engagement with the corresponding engaging holes H of the upper receiving plate 4. As a result, the fixing bracket 11 is fixedly secured to the upper receiving plate 4 and, at the same time, the upper terminal part 7a of the protective boot 7 is attached infallibly, though indirectly, to the upper receiving plate 4, as illustrated in FIG. 1 and FIG. 6.

The illustrated suspension device is so constructed that when the lower terminal part 7b of the protective boot 7 is retained in place by a retaining part 10 fixedly disposed on the upper terminal part of the dumper case 1, the lower terminal part 7b of the protective boot 7 is consequently fixed, and the region which would remain open in the conventional suspension device is closed.

Even when the protective boot 7 constructed as described above is in its fixed state, the impact and vibration transmitted from the road surface in consequence of the vertical motion of the wheel are efficiently absorbed, because the piston rod 2 is allowed to slide inside the dumper case 1 and, at the same time, the compression coil spring 6 is expanded or contracted in accordance with the condition of the road surface. In this case, when the compression coil spring 6 is expanded or contracted, this compression coil spring 6 is inevitably twisted, and the upper receiving plate 4 is rotated in the same direction through the bearing 5.

In the illustrated suspension device, unlike the conventional countertype which has the upper terminal part of the protective boot directly fixed to the upper receiving plate, since the upper terminal part 7a of the protective boot 7 is attached to the upper receiving plate 4 through the fixing bracket 11, only the stationary ring 12 and the spacer ring 13 of the fixing bracket 11 are rotated jointly with the upper receiving plate 4 when the upper receiving plate 4 is rotated synchronously with the twisting of the compression coil spring 6. The fastening ring 14 which fastens the protective boot 7 merely allows synchronous rotation of these rings 12 and 13 and does not allow itself to be jointly rotated therewith.

In the case of the fixing bracket 11 involved in the first embodiment, unlike the conventional countertype, the possibility that the upper terminal part 7a of the protective boot 7 will be automatically twisted as a consequence of the synchronous rotation of the upper receiving plate 4, and the possibility that the upper terminal part 7a of the protective boot 7 will be consequently broken through fatigue, can be eliminated even when the lower terminal part 7b of the protective boot 7 is fixed through the retainer part 10.

Furthermore, the fact that the fastening ring 14 is retained in place on the stationary ring 12 by virtue of the resilient force derived from the resilient supporting arms 19 of the spacer ring 13, of course, ensures smooth relative rotation between the stationary ring 12 and the fastening ring 14, allows efficient absorption of the vibration on the side of the protective boot 7 by the flexion of the resilient supporting arms 19, and warrants efficient absorption of dimensional error between the fastening ring 14 and the spacer ring 13.

Figure 8:
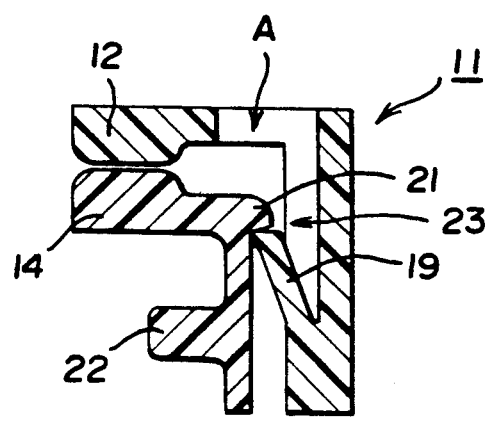
FIG. 8 is a cross sectional view illustrating the fixing bracket of FIG. 7, but in an assembled state, and cut at a position of a resilient supporting arm thereof.
Figure 9:
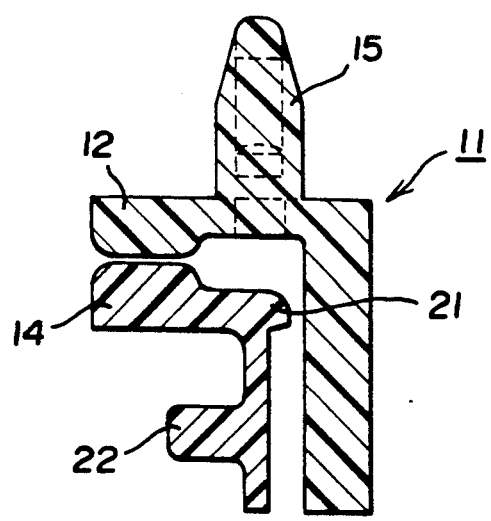
FIG. 9 is a cross sectional view illustrating the fixing bracket of FIG. 7, but in an assembled state, and cut at a position of a resilient engaging leg thereof.

The second embodiment of the fixing bracket 11 according to the present invention will now be described with reference to FIGS. 7 to 9.

Figure 7:
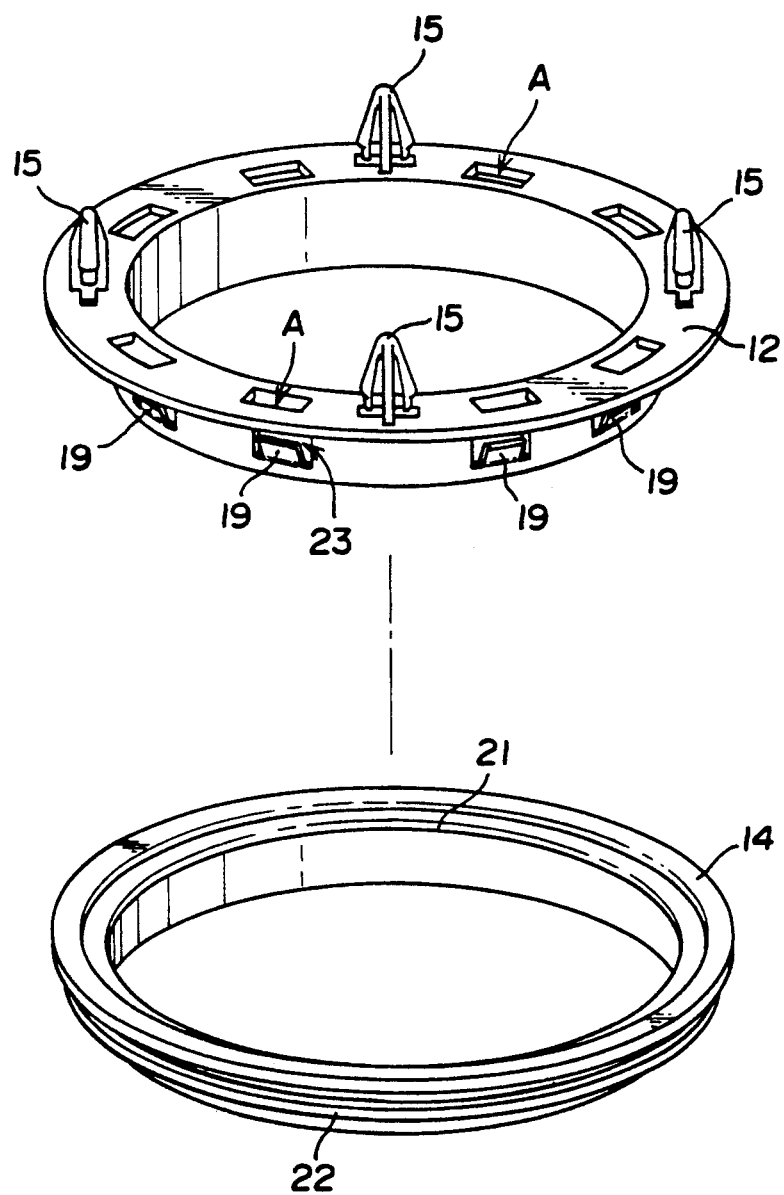
FIG. 7 is an exploded perspective view illustrating another embodiment of a fixing bracket according to the present invention.

The fixing bracket 11 of the second embodiment also has been developed for the purpose of fastening the upper terminal 7a of the protective boot 7 installed in the aforementioned automobile suspension device, but is characterized by decreasing the number of the component parts to two, i.e. a stationary ring 12 and a fastening ring 14 as illustrated in FIG. 7, thereby improving the assembling operation.

The stationary ring 12 is so constructed that a plurality of resilient engaging legs 15 adapted to be fastened to as many engaging holes H bored in the upper receiving plate 4 are integrally projected from a horizontal wall part in the same manner as in the first embodiment and that a plurality of outwardly projecting resilient supporting arms 19 provided on the spacer ring 13 in the first embodiment are formed on the stationary ring 12 so as to extend aslant from a vertical wall part through empty spaces 23. The fastening ring 14 of the same construction as in the first embodiment can be applied to the second embodiment. Therefore, the annular shoulder part 21 of the fastening ring 14 is resiliently supported by the leading ends of the supporting arms 19 of the stationary ring 12 to rotatably support the fastening ring 12 directly on the stationary ring 14. Reference symbol A in FIGS. 7 and 8 designates apertures for use in the mold releasing operation.

According to the second embodiment, therefore, when the fastening ring 14 is fitted directly on the stationary ring 12 from the outside with the aid of the flexibility of the resilient supporting arms 19 of the stationary ring 12, the fastening ring 14 is eventually retained rotatably on the stationary ring 12 without use of the spacer ring 13 used in the first embodiment. Therefore, the same function and effect as in the first embodiment can be obtained according to the second embodiment by the following steps, not illustrated in FIGS. 7 to 9, of causing the upper terminal part 7a of the protective boot 7 to be caught on the annular hooking part 22 of the fastening ring 14 and forcing the resilient engaging legs 15 of the stationary ring 12 into engagement with the corresponding engaging holes H of the upper receiving plate 4.

The fixing bracket 11 of either the first embodiment or the second embodiment according to the present invention is ideally used when the protective boot 7 installed in a hydraulically controlled automobile suspension device, which is expected to manifest a particularly high sealing property, is attached to the upper receiving plate 4. It goes without saying that the present invention should not be limited to use for the protective boot of this kind, but may be applied to any flexible tube which requires the fixed terminal part thereof to be prevented from twisting.

As described above, the fixing bracket of the present invention comprises a stationary ring to be fixed on a prescribed member, a spacer ring to be fitted to the stationary ring, and a fastening ring adapted to fasten a terminal part of a flexible tube to the spacer ring. The spacer ring is provided with resilient supporting arms, the fastening ring being rotatably retained on the stationary ring through the spacer ring by virtue of the resilient force derived from the resilient supporting arms. Alternatively, the fixing bracket comprises a stationary ring to be fixed on a prescribed member and a fastening ring adapted to fasten a terminal part of a flexible tube to the stationary ring. The stationary ring is provided with resilient supporting arms, the fastening ring being rotatably retained directly on the stationary ring by virtue of the resilient force derived from the resilient supporting arms. Since the fixing bracket is infallibly fixed on a prescribed member through the stationary ring, and since the flexible tube fastened by the fastening ring is allowed to be freely rotated relative to the stationary ring, the possibility that the terminal part of the flexible tube will be twisted in consequence of the rotation of the prescribed member, and will thus eventually be broken through fatigue, can be avoided.

Moreover, the fact that the fastening ring is rotatably retained in place by the stationary ring by virtue of the resilient force derived from the resilient supporting arms of the spacer ring or of the stationary ring has the advantage of ensuring smooth relative rotation, allowing highly efficient absorption of the vibration on the side of the flexible tube by the flexion of the resilient supporting arms, and effectively absorbing the dimensional error between the fastening ring and the spacer ring.

When the fixing bracket of the present invention is used in a hydraulically controlled automobile suspension device which is expected to manifest a high sealing property, therefore, it is possible to completely avoid the possibility that the upper terminal part of the protective boot will be twisted in consequence of the fixation of the lower terminal part of the protective boot and will be eventually broken through fatigue.

What is claimed is:

1. A fixing bracket for fixing the end of a flexible tube to a member, comprising:

a stationary ring fixed to said member, said member having a plurality of engaging holes therein, said stationary ring comprising a first horizontal wall portion, a first vertical wall portion connected with said first horizontal wall portion and having an outer side, a plurality of resilient engaging legs projecting upwardly from said horizontal wall portion and engaging said engaging holes of said member, a plurality of depressions having lower edges spaced equidistantly about said outer side of said vertical wall portion and a plurality of lock claws disposed along said lower edges of respective said depressions;

a spacer ring fitted to said stationary ring comprising a second horizontal wall portion, a second vertical wall portion connected with said second horizontal wall portion and having an inner side, a plurality of engaging claws on said inner side of said second vertical wall engaging said lock claws of said stationary ring and a plurality of resilient supporting arms extending outwardly from said engaging claws; and a fastening ring fitted to said spacer ring and fastened with said flexible tube, comprising a third horizontal wall portion having an inner terminal edge, a third vertical wall portion having an outer side and connected with said third horizontal wall portion, an annular shoulder projecting inwardly along said inner terminal edge rotatably supported by said resilient supporting arms of said spacer ring, and an annular projection projecting from said outer side of said third vertical wall portion fastened with said flexible tube.

2. The fixing bracket of claim 1, wherein said stationary ring, said spacer ring and said fastening ring are all made of synthetic resin.

3. The fixing bracket of claim 1, wherein said second vertical wall portion has a plurality of apertures through which respective said resilient supporting arms extend.

4. A fixing bracket, comprising:

a stationary ring comprising a first horizontal wall portion, a first vertical wall portion connected with said first horizontal wall portion and having an outer side, a plurality of resilient engaging legs projecting upwardly from said horizontal wall portion, a plurality of depressions having lower edges spaced equidistantly about said outer side of said vertical wall portion and a plurality of lock claws disposed along said lower edges of respective said depressions;

a spacer ring for connection to said stationary ring comprising a second horizontal wall portion, a second vertical wall portion connected with said second horizontal wall portion and having an inner side, a plurality of engaging claws on said inner side of said second vertical wall for engaging said lock claws of said stationary ring and a plurality of resilient supporting arms extending outwardly from said engaging claws; and a fastening ring for connection to said spacer ring comprising a third horizontal wall portion having an inner terminal edge, a third vertical wall portion having an outer side and connected with said third horizontal wall portion, an annular shoulder projecting inwardly along said inner terminal edge for being supported by said resilient supporting arms of said spacer ring, and an annular projection projecting from said outer side of said third vertical wall portion.

5. The fixing bracket of claim 4, wherein said stationary ring, said spacer ring and said fastening ring are all made of synthetic resin.

6. The fixing bracket of claim 4, wherein said second vertical wall portion has a plurality of apertures through which respective said resilient supporting arms extend.

* * * * *